Feb. 4, 1936.  M. HALPERN ET AL  2,030,030
PYROLYSIS OF HYDROCARBON GASES
Filed June 30, 1932
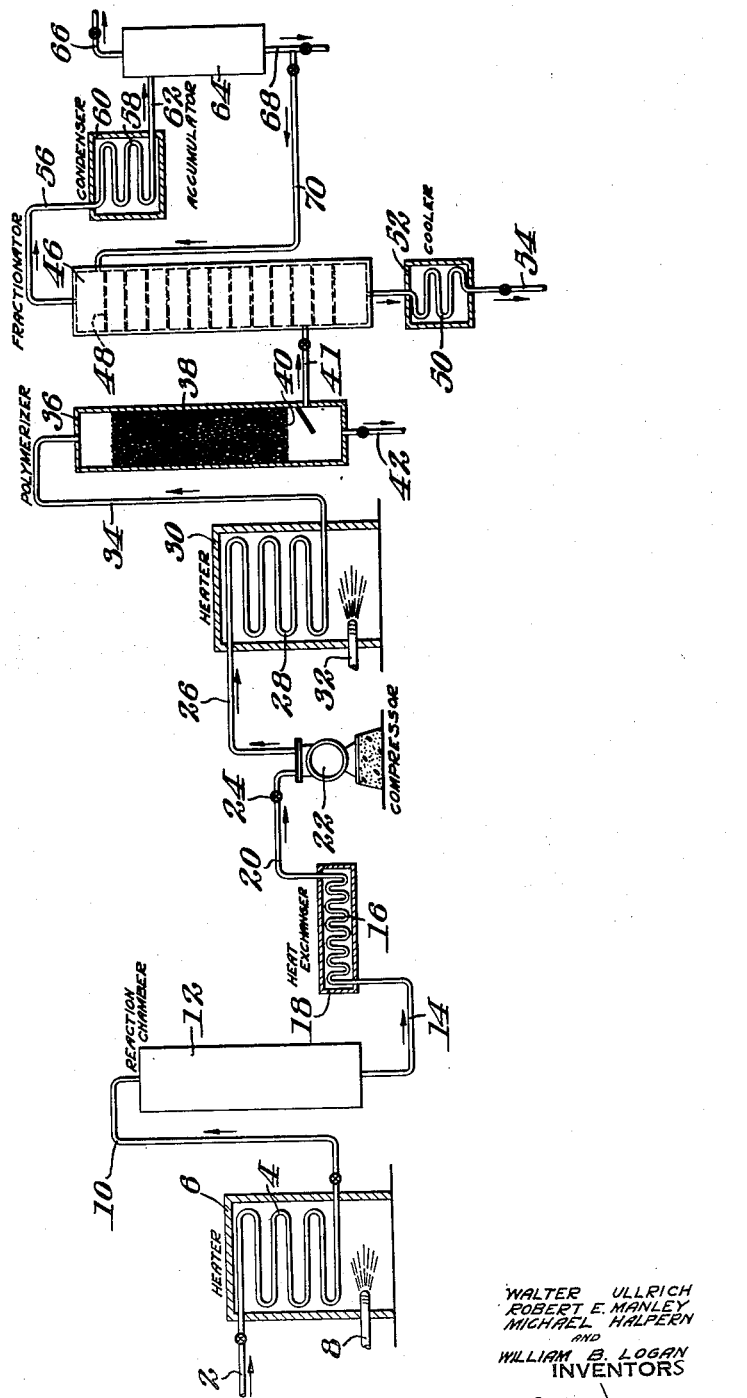
WALTER ULLRICH
ROBERT E. MANLEY
MICHAEL HALPERN
AND
WILLIAM B. LOGAN
INVENTORS
BY R. J. Dearborn
THEIR ATTORNEY Patented Feb. 4, 1936

2,030,030

UNITED STATES PATENT OFFICE 2,030,030

PYROLYSIS OF HYDROCARBON GASES

Michael Halpern, New York, William B. Logan, White Plains, and Robert E. Manley and Walter Ullrich, Beacon, N. Y., assignors to The Texas Company, New York, N. Y., a corporation of Delaware Application June 30, 1932, Serial No. 620,168

3 Claims. (Cl. 196—10)

This invention relates to the pyrolysis of hydrocarbon gases and has to do particularly with the conversion of normally gaseous hydrocarbons into higher molecular weight compounds by a two-stage process in which the gases are cracked into products having a high degree of unsaturation in the first stage, and then the cracked products are polymerized with the aid of an adsorptive catalyst into higher boiling point, condensable hydrocarbons in the second stage.

An object of the invention is to convert natural or refinery gases or fractions thereof into liquids, such as gasoline and the like, which are suitable for the manufacture of high anti-knock motor fuels.

An important object of the invention is to increase the yield and to improve the character of the liquid products by carrying out the polymerizing operation in the presence of a highly efficient adsorptive catalyst.

Valuable synthetic lubricating oils may be obtained in the use of the invention as a result of the polymerization of the highly unsaturated constituents of the gases treated.

It has been proposed heretofore to convert hydrocarbon gases into liquid products by a two-stage process in which the gases are cracked into substantial amounts of olefins, and then the unsaturated cracked products polymerized to higher boiling compounds which may be recovered as liquids, by passing the cracked products through a porous contact agent adapted to promote the formation of the desired materials. The porous contact agents in the past, however, have been non-adsorptive or low power adsorptive materials and relatively coarse in mesh.

Instead of using a relatively coarse low power adsorptive catalyst as the polymerizing agent in our process, we prefer to use an agent or agents produced by acid treating certain clays, for example, those of the Bentonite or Montmorrillonite type as described in U. S. Patent No. 1,642,811, September 20, 1927, to Chappell et al. Such materials are of relatively fine mesh, for example, in excess of 100 mesh and usually 50–100% finer than 200 mesh.

The gases suitable for treatment according to the invention may be any of the normally gaseous petroleum hydrocarbons occurring in nature or refinery practice. Natural gases, such as the more volatile constituents of casinghead gasoline or the gases of a permanent nature separated from fractionators in the natural gasoline industry, or a special fraction, such as one consisting essentially of propane or butane or a mixture thereof, which may be separated from or used as a reflux in natural gasoline stabilizers, are useful for this purpose. Refinery gases comprising condensable vapors and light combustible hydrocarbons escaping from storage tanks, treating equipment and crude stills, and cracked gases evolved from cracking stills may be used. Also, residual gases from the present or similar pyrolysis operations may be circulated through the same or equivalent systems to produce additional amounts of products. It is to be understood, of course, that any of the foregoing charging stocks may be further processed before use, say by fractionation to segregate the undesirable from the desirable components, or by a suitable chemical wash to remove sulfur or other undesirable compounds.

In accordance with the invention, the hydrocarbon gases to be treated are first subjected to a pyrolytic cracking operation under high temperature and low or moderately high pressure to produce cracked products having a high degree of unsaturation, for example, products containing substantial amounts of unsaturated compounds or olefins. The gases are rapidly heated preferably by passage in a restricted stream through a heating zone and then digested, if desired, for a suitable time in a reaction zone. The time of contact and the temperature are predetermined to give a maximum yield of olefins and a minimum deposition of carbon. The resulting products, consisting of a mixture of hydrocarbons containing polymerizable unsaturated compounds, after the adjustment of the temperature thereof to the proper point, are subjected to a polymerizing operation under a substantial pressure, and preferably at a somewhat lower temperature than the cracking operation. In the polymerizing operation, the cracked products are intimately contacted, for example, by filtration, with a polymerizing agent or catalyst consisting of a highly efficient comminuted adsorptive material, preferably a high power clay such as one of the commercial acid treated clays. The cracked products in passing through the catalyst are polymerized and purified whereby liquid products may be obtained which are suitable for the manufacture of a high grade of motor fuel, or a motor fuel blending fluid, and more viscous higher boiling products which may be suitable for the manufacture of synthetic lubricating oils.

The invention may be more clearly understood by reference to the accompanying drawing in which the single figure represents diagrammatically one form of apparatus for practicing the invention. The apparatus may vary in form, as will be explained hereinafter, but for purposes of illustration it has been shown as a specific type and it will be understood that variations in the individual elements are limited only by the functions to be performed thereby.

Referring to the drawing, the reference character 2 designates a charging line for charging the gases to be treated from any suitable source of supply to a heating coil 4 positioned within a heater or furnace 6. The gas, in passing through the coil, is raised to a conversion temperature by heat supplied from a burner 8, or other suitable heating means, and then the hot products are transferred through a line 10 to a reaction chamber 12. The reaction chamber is preferably constructed to withstand high pressures and in the drawing is shown as an enlarged vertical drum or tower, but the reaction vessel is not limited to such a particular structure, for it may conveniently assume other forms or even be an elongated tubular element or any other suitable apparatus which will provide space for the proper time factor to produce the desired amount of conversion. The reaction chamber may be packed, if desired, with a suitable contact material, such as alumina, pumice, fuller's earth, or bauxite, to promote the conversion. In some cases it may be advantageous to eliminate the reaction chamber and so control conditions that the desired conversion will be accomplished entirely in the heating coil.

The products from the reaction chamber are passed through a line 14 to a heat exchange coil 16 located in an exchanger 18. The heat exchanger 18 is ordinarily used to cool the hot products passing through the coil 16 and for this purpose water, steam, or other cooling medium may be used, but it is usually desirable to use the exchanger to preheat the fresh charge prior to charging it to the heater. The cracked products, after adjustment of temperature in the heat exchanger, are conducted through a line 20 to compressor 22. The compressor serves to boost the pressure on the cracked products in case it is desired to maintain a higher pressure on the succeeding parts of the apparatus than on the heater and reaction chamber. Otherwise, the compressor may be by-passed and even a higher pressure may be carried on the heater 4, reaction chamber 12, and exchanger 16 than on the succeeding parts of the equipment by suitable adjustment of a valve, such as valve 24 in the line 20. The products from the compressor are discharged through a line 26 to a heating coil 28 located within a heater 30 which is supplied with heat from a burner 32.

The heater 30 is shown similar in construction to heater 6 but the heating capacity thereof is usually considerably less and accordingly a shorter coil than that of heater 6 is often sufficient. The heater 30 is ordinarily used for purposes of conditioning the temperature of the cracked products prior to subjecting them to the polymerizing operations, since fluctuations in temperature may occur due to cooling of the gases prior to compression or as a result of wide changes in pressure which may be brought about by the compressor. The burden on the heater is usually small and for that reason the heat may be supplied from any suitable means, or the heater may assume other forms, such as a heat exchanger wherein either heating or cooling may be quickly applied to effect control of the temperature. The products, after proper conditioning as to temperature in the coil 28, are passed through a line 34 to a polymerizer 36.

The polymerizer preferably consists of an enlarged chamber, or other means for holding a polymerizing agent 38, and is preferably constructed to withstand high pressures. In the drawing the polymerizer is shown as a tower containing a bed of adsorptive catalyst supported on a perforated plate or screen 40. The tower is shown in a vertical position so that any polymers or other high boiling liquids which may form may be drained from the catalyst or collected at the bottom of the tower where they may be withdrawn through a valved line 42. The treated vapors and gases are passed through a valve controlled line 44 to a fractionator 46 where partial condensation and fractionation may be accomplished at the same pressure as that of the polymerizer or a substantially reduced pressure, if desired.

The fractionator 46 is shown as a tower fitted with vertically spaced plates 48 but it is contemplated that the tower may assume the form of a vapor recovery plant wherein a solid adsorbent, such as charcoal, or a liquid absorption medium flowing countercurrent to the direction of the gas may be used to strip the condensable vapors from the gases. In the particular fractionator shown in the drawing the higher boiling constituents condensed in the tower are withdrawn from the bottom through the cooling coil 50 located in a cooler 52 and then passed to storage through a line 54. The uncondensed vapors and gases from the top of the fractionator are passed through a vapor line 56 to a condenser coil 58 positioned within a condenser box 60. The liquids condensed in the coil 58 together with the uncondensed vapors and gases are passed through a rundown line 62 to an accumulator 64 wherein separation of gases and liquids occurs, the former being released through a valved line 66 and the latter withdrawn through a line 68 to storage. A portion of the hydrocarbons withdrawn from the bottom of the accumulator is preferably returned to the top of the fractionator through a line 70 to serve as a reflux medium.

A suitable procedure will now be given for the operation of our process with an apparatus such as that shown in the drawing. A hydrocarbon, such as natural gas, or other charging stock as described heretofore, under pressure from atmospheric to 200 lbs. per sq. in., preferably around 100 lbs. per sq. in., is rapidly raised to a temperature of about 600–950° C., and preferably about 800° C., in the heating coil, and then allowed to digest in the reaction chamber. The temperature in the reaction chamber will remain at approximately the same temperature as that of the entering gases without the addition of further heat, or the temperature may even tend to rise somewhat, and in such a case it is sometimes advantageous to introduce a small amount of cool charging stock into the reaction chamber to control the temperature. The time of reaction required in the reaction chamber will usually be within the range of about 1/10–5 minutes and preferably around one minute. However, if a catalytic contact material, such as pumice, is used in the reaction chamber the time may be somewhat shorter. The time is regulated to produce a maximum amount of olefins without the formation of appreciable quantities of polymerized or other higher molecular weight compounds.

The products from the reaction chamber, under proper conditions of treatment, will have a high degree of unsaturation and contain a substantial amount, say from 25–75%, and preferably at least 50%, of olefins. The hot products are then cooled in the exchanger by heat exchange with fresh charging stock to about 300° C.–600° C. The cracked materials at this temperature are next compressed to a pressure of about 200–5,000 lbs. per sq. in. and preferably about 1,000 lbs. per sq. in. A slight change in temperature may occur during compression but the temperature may be adjusted to any desired point by means of the second heater. A suitable temperature at this point may be between 250° C. and 750° C. and preferably around 475° C. The products, under these conditions, are passed through the polymerizer containing a bed of acid treated clay, as described heretofore, which has a fineness in excess of 100 mesh and preferably around 85% finer than 200 mesh. The bed of clay may range from 5–20 ft. in depth and a considerable drop in pressure on the gases will usually occur in passing through the clay bed, for example, as much as 50–500 lbs.

The cracked products, while passing through the bed of adsorptive catalytic material, are extensively polymerized into higher molecular weight compounds which may be separated as a liquid fraction with a wide boiling range and containing a mixture of hydrocarbons suitable for the manufacture of a number of valuable products. The liquid fraction may be separated into materials ranging from gasoline to lubricating oil, but for simplicity we have shown only the segregation of the major constituents. A high boiling tarry fraction may separate from the clay in the polymerizer and accumulate at the bottom of the tower where it can be withdrawn through the drawoff line. The gases and vapors containing the motor fuel and more viscous material of the nature of synthetic lubricating oil are passed to the fractionator wherein substantially all the constituents higher boiling than motor fuel are condensed. The polymer fraction containing materials with boiling points corresponding to kerosene gas oil, and lubricating oil distillate may be withdrawn from the bottom of the fractionator. The polymer fraction may be separated into a number of valuable products, for example, a lower boiling product containing kerosene, gas oil, etc., to be further processed into the individual components or used as cracking stock, and a higher boiling fraction which, under proper conditions of operation, may be suitable for the production of a series of synthetic lubricating oils, ranging in viscosity from 200–1,000 seconds at 100° F. (Saybolt). The motor fuel fraction is conducted overhead from the fractionator and is condensed into a gasoline-like material which is very stable and high in anti-knock value.

Instead of using a high pressure on the material in the polymerizing operation, a low super-atmospheric pressure, say from 10–200 lbs. may be used. It will be understood that both the cracking step and the polymerizing step may be operated under substantially atmospheric pressure or low super-atmospheric pressure or either of them under high pressure, independent of the pressure maintained on the other step; or in other words, the pressure may be reduced or elevated as the products pass from the cracking operation to the polymerizing operation.

In case the polymerizing agent tends to pack or offer excessive resistance to the flow of the vapors therethrough, it may be advantageous to mix a filter aid material, such as filter cel or kieselguhr, with the clay in sufficient amount to substantially reduce the back pressure which may develop. An amount of filter aid material equivalent to about 5–25% by weight of the clay is sufficient for most purposes.

Obviously, many modifications and variations of the invention, as hereinbefore set forth, may be made without departing from the spirit and scope thereof, and therefore only such limitations should be imposed as are indicated in the appended claims.

We claim:

1. In the conversion of normally gaseous hydrocarbons into higher molecular weight hydrocarbons by subjection of the gases to be treated to a pyrolysis operation to cause substantial cracking of paraffins into olefins and then passage of the resultant cracked products through an adsorptive catalyst to effect polymerization of the olefins into higher molecular weight compounds, the improvement which comprises passing the cracked products in the polymerization operation through a catalyst consisting essentially of a high power clay of the acid treated montmorillonite type and characterized by having 50–100% thereof finer than 200 mesh and a filter aid material in sufficient amount to substantially reduce the resistance of the clay to the flow of vapors and gases therethrough.

2. The method of treating gases and vapors resulting from a gas pyrolysis operation to convert unsaturated constituents thereof into higher molecular weight compounds suitable for the manufacture of motor fuel which comprises polymerizing the gases and vapors to be treated at 300° C.–600° C. in the presence of a high power adsorptive material of the nature of acid treated montmorillonite clay characterized by having 50–100% thereof finer than 200 mesh and 5–25% of a filter aid material consisting essentially of diatomaceous earth in admixture therewith.

3. The method according to claim 2 in which the gases during the polymerizing operation are maintained under a pressure of 200–5000 lbs. per sq. in.

MICHAEL HALPERN.
WILLIAM B. LOGAN.
ROBERT E. MANLEY.
WALTER ULLRICH.